US007957015B2

(12) United States Patent
Kammerlocher et al.

(10) Patent No.: US 7,957,015 B2
(45) Date of Patent: Jun. 7, 2011

(54) MANAGING A CONTROL VARIABLE FOR A PRINTING SYSTEM BY MEANS OF A DATABASE

(75) Inventors: Alexander Kammerlocher, Zorneding (DE); Alexander Oszwald, Olching (DE); Bernd Pompe, München (DE); Thomas Meder, Erding (DE); Andreas Schwarzmüller, München (DE); Waldemar Graf, Ingolstadt (DE); Ulrich Bardolatzy, Poing (DE)

(73) Assignee: Oce Printing Systems GmbH, Poing (DE)

( * ) Notice: Subject to any disclaimer, the term of this patent is extended or adjusted under 35 U.S.C. 154(b) by 929 days.

(21) Appl. No.: 10/531,921

(22) PCT Filed: Oct. 28, 2003

(86) PCT No.: PCT/EP03/11959

§ 371 (c)(1),
(2), (4) Date: Jul. 7, 2005

(87) PCT Pub. No.: WO2004/038514

PCT Pub. Date: May 6, 2004

(65) Prior Publication Data

US 2005/0254090 A1 Nov. 17, 2005

(30) Foreign Application Priority Data

Oct. 28, 2002 (DE) .................................. 102 50 189

(51) Int. Cl.
*G06F 15/00* (2006.01)
*G06F 3/12* (2006.01)
*G06F 17/30* (2006.01)
*G06F 7/00* (2006.01)
*G06F 15/173* (2006.01)

(52) U.S. Cl. ...... 358/1.15; 358/1.13; 707/705; 709/223; 709/224; 709/225

(58) Field of Classification Search .................. 358/1.1, 358/1.15, 1.13, 1.9, 1.18
See application file for complete search history.

(56) References Cited

U.S. PATENT DOCUMENTS 5,537,626 A 7/1996 Kraslavsky et al.
6,125,372 A * 9/2000 White .......................... 707/205
6,178,004 B1 * 1/2001 Ochiai ......................... 358/1.14
6,313,921 B1 * 11/2001 Kadowaki .................... 358/1.15
6,349,304 B1 * 2/2002 Boldt et al. ........................... 1/1
6,661,528 B2 * 12/2003 Miura et al. ................. 358/1.13
7,200,613 B2 * 4/2007 Schlonski et al. ......... 707/104.1
(Continued)

FOREIGN PATENT DOCUMENTS

DE 198 36 745 2/2000
EP 0 239 845 3/1987
EP 0 926 593 6/1999
(Continued)

*Primary Examiner* — King Y Poon
*Assistant Examiner* — Ming Hon
(74) *Attorney, Agent, or Firm* — Schiff Hardin LLP

(57) ABSTRACT

In a control system or method for input or output of operating information and control data of a printing or copying system, the operating information is input or output with aid of at least one operating unit. The printing or copying system is controlled via a first control unit and at least one second control unit. Control data are transferred between the control units via a data line with aid of a data transfer protocol. A server which the operating unit accesses as a client is provided. At least one part of the transferred control data is input or output with aid of the operating unit of the printing or copying system.

11 Claims, 9 Drawing Sheets

U.S. PATENT DOCUMENTS

| | | | | |
|---|---|---|---|---|
| 7,389,329 | B2 * | 6/2008 | Naito et al. | 709/219 |
| 2001/0038461 | A1 * | 11/2001 | Murakami et al. | 358/1.13 |
| 2003/0011633 | A1 * | 1/2003 | Conley et al. | 345/762 |
| 2003/0046390 | A1 * | 3/2003 | Ball et al. | 709/224 |
| 2003/0055965 | A1 * | 3/2003 | Colby et al. | 709/225 |
| 2003/0090697 | A1 * | 5/2003 | Lester et al. | 358/1.14 |
| 2003/0093675 | A1 * | 5/2003 | Hibino et al. | 713/168 |
| 2003/0217195 | A1 * | 11/2003 | Mandal et al. | 709/330 |

FOREIGN PATENT DOCUMENTS

| | | | |
|---|---|---|---|
| JP | 07123224 | | 5/1995 |
| JP | 11231580 | | 8/1999 |
| JP | 2001175622 | A | 6/2001 |
| JP | 2002046326 | | 2/2002 |
| JP | 2002171383 | A | 6/2002 |
| JP | 2002232636 | A | 8/2002 |
| WO | WO 97/43720 | | 11/1997 |

* cited by examiner

MANAGING A CONTROL VARIABLE FOR A PRINTING SYSTEM BY MEANS OF A DATABASE

BACKGROUND

The preferred embodiment concerns a control system for an electrophotographic printing or copying system. The control system contains an operating unit for input and/or output of operating information of the printing or copying system.

Known electrophotographic printers or copiers contain an operating unit via which the execution of print jobs, the operating mode of the printer as well as parameters and setting values of the printer can be shown to an operating personnel with the aid of a graphical user interface, whereby the operating personnel implements operator control actions via inputs with the aid of the graphical user interface. The setting values in particular concern parameters of the printer or copier that an operating personnel must set to implement different print jobs. These parameters are, for example, parameters of carrier material to be printed and parameters of toner material used to generate print images. The operator control actions to be executed by an operating personnel also concern settings to produce the operational readiness and the establishment of the sequence as well as the start of print jobs that should be executed by the printer or copier.

Access to internal control variables of the printer or copier are not possible with the aid of the operating unit. For service and maintenance tasks as well as for diagnostic functions, given the output of false operating information the accesses to internal control variables of the printer or copier are, however, necessary (in particular for troubleshooting) in order to add the values of the internal control variables that serve as output values for generation of the output operating information. These values of the internal control variables are also designated as raw data from which display data are then generated. Display data are then generated with the help of the system. The operating information are then output with the aid of the display data.

A method and a system for printing of documents based on JAVA commands are known from the document WO 97/43720. Setting values for configuration of the printer can be set with the aid of user interfaces, whereby the printer can also be connected with the computer over a network, preferably over the Internet.

A computer system is known from the document EP 0 926 593 A12 in which the data exchange between a personal computer and a printer is in particular implemented via the use of elements present in the programming language JAVA.

An activation arrangement to control a plurality of printers operating in what is known as tandem operation is known from the document EP 0 239 845. For this, a belt-shaped recording medium is provided on the front side with one print image by the first printer and on the back side with one print image by the second printer.

From the document DE 198 36 745 A1 it is known that operating information of the printing or copying system can be input and/or output with the aid of an operating unit. At least two control units are connected with a data line for control of at least one part of the electrophotographic printing or copying system. Control data can be transferred between the control units with the aid of the data line.

SUMMARY

It is an object to specify a control system with an operating unit for an electrophotographic printing or copying system in which the access to control variables is also possible in a simple manner.

In a control system or method for input or output of operating information and control data of a printing or copying system, the operating information is input or output with aid of at least one operating unit. The printing or copying system is controlled via a first control unit and at least one second control unit. Control data are transferred between the control units via a data line with aid of a data transfer protocol. A server which the operating unit accesses as a client is provided. At least one part of the transferred control data is input or output with aid of the operating unit of the printing or copying system.

DESCRIPTION OF THE PREFERRED EMBODIMENTS

Figure 1:
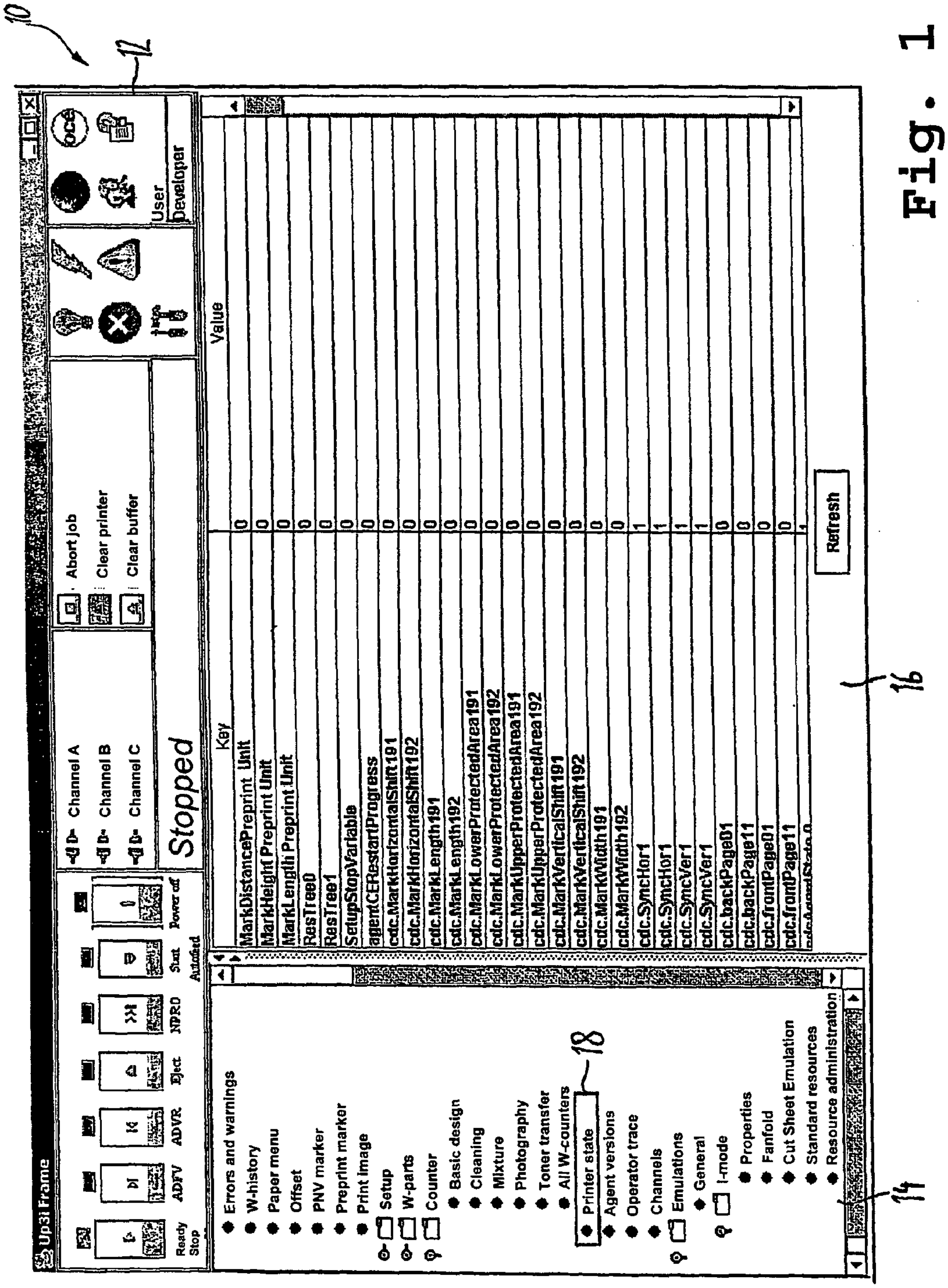
FIG. 1 is a graphical user interface for input and output of control variables of a printing system according to a first exemplary embodiment of the invention.

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

Via a control system with the features of the preferred embodiment, it is achieved that at least one part of the transferable control data is input and/or output in addition to the operating information. These control data are preferably used for error diagnosis and for function monitoring of the printing or copying system. A separate service and maintenance computer is thus not absolutely necessary for display and input of control data. However, if a service and maintenance computer is connected with the electrophotographic printing or copying system, operating information of the printing or copying system can be input and/or output by the service and maintenance computer in addition to the control data, since the graphical user interface for operation of the printing or copying system is preferably also output with the aid of the service and maintenance computer.

A second aspect of the preferred embodiment concerns a method for input and/or output of operating information and control data of an electrophotographic printing or copying system with the aid of an operating unit. Operating information of the printing or copying system are input and/or output with the aid of at least one operating unit. The electrophotographic printing or copying system is controlled by a first control unit and at least one second control unit. The control data are transferred between the control units via a data line. At least one part of the transferred control data is input and/or output on an operating unit of the printing or copying system.

Via this method of the preferred embodiment it is achieved that a separate service and maintenance computer is not absolutely necessary for maintenance and service tasks and for error diagnosis. Furthermore, via this method it is achieved that a maintenance computer connected with the printing or copying system can display both the control data and the operating information. Not only control data but rather also operating information can in particular be displayed by the service and maintenance computer when a service and maintenance computer is arranged in a service control center and is connected with the printing or copying system via a remote data transfer connection.

A third aspect of the of the preferred embodiment concerns a system for administration and transfer of control data of an electrophotographic printing or copying system. Information about the control data are stored in a central database of the printing or copying system. At least one first control unit of the printing or copying system has access to the control data with the aid of this information.

Via this system of the preferred embodiment it is achieved that an access to the control data is possible in a simple manner. The database contains at least information via which an access to the control data is enabled. A simple administration of the control data is thereby possible and the access to the control data is significantly simplified.

A fourth aspect of the of the preferred embodiment concerns a method for transfer of control data of an electrophotographic printing or copying system. In this method information of the control data are stored in a central database of the computer program system. A first control unit of the printing or copying system accesses the control data with the aid of this information.

Via this method of the preferred embodiment it is achieved that a very simple and concise administration of the control data occurs with the aid of the database. A simple access to these control data is thus possible with the aid of the information stored in the database.

A fifth aspect of the of the preferred embodiment concerns a electrophotographic printing or copying system with at least two printing units. The first printing unit comprises a first operating unit and a first control unit. The second printing unit comprises a second operating unit and a second control unit. Data that contain operating information data and/or control data regarding input and/or output via the operating unit can be transferred between the first control unit and the second control unit. The first control unit prepares data for the first operating unit and data for the second operating unit. It is thereby achieved that data of the second printing unit can be displayed with the aid of the first operating unit and data of the first printing unit can be displayed with the aid of the second operating unit. An operating of the first and the second printing units with the aid of the first and/or second operating unit can thus occur very simply, whereby an operation of both printing units with the aid of one operating unit is possible.

A sixth aspect of the preferred embodiment concerns a method regarding input and/or output of operating information of an electrophotographic printing or copying system with at least two printing units. The first printing unit is operated with the aid of the first operating unit and is controlled with the aid of a first control unit. The second printing unit is operated with the aid of a second operating unit and is controlled with the aid of a second control unit. Data that contain operating information and/or control data that are input and/or output by the operating units are transferred between the control units.

Data that are generated by the first control unit are provided for the first operating unit and the second operating unit.

Via this method of the preferred embodiment it is achieved that operating information and/or control data of the first and the second control unit can be input and/or output in a simple manner both by the first operating unit and by the second operating unit, whereby the operating of both printing units is simplified.

A seventh aspect of the preferred embodiment concerns an electrophotographic printing or copying system with at least two printing units. This printing or copying system contains an operating unit regarding input and/or output of parameters of the printing or copying system. Given an input of a value of a first parameter of a first printing unit, the value of the same parameter of the second printing unit is automatically changed dependent on the altered value. It is thereby achieved that a parameter to be changed must only be changed once in order to change the respective parameter of both printing units.

An eighth aspect of the preferred embodiment concerns a method for control of an electrophotographic printing or copying system with two printing units. Parameters of the printing or copying system are input and/or output with the aid of an operating unit. Given an input of a value of a first parameter of a first printing unit, the value of an identical parameter of the second printing unit is automatically changed dependent on the value of the first parameter.

Via this method of the preferred embodiment it is achieved that the operating inputs in the changing of parameters are simplified and errors are prevented in a simple manner.

A graphical user interface for operation of an electrophotographic printing system with a section with a toolbar 12 is shown in FIG. 1, which toolbar 12 contains graphical function keys, what are known as buttons. The toolbar 12 furthermore contains output fields, in particular for display of the operating state of the printing system and a set user. The graphical user interface 10 contains a menu in a second section 14. The graphical user interface 10 contains a third section 16 in which is displayed a user interface that has been selected from a plurality of possible user interfaces with the aid of the menu entries contained in the menu 14. The user interface shown in the section 16 in FIG. 1 has been selected via selection of the menu entry 18 "printer state" and contains the names of variables of the printing system in the column "Key" and, in the column "Value", the current value of the respective variable designation arranged in the same row of the column "Key". These variables of the printing system are internal control variables of the printing system from which display values are generated as operating information and output with the aid of the user interface.

The access to these variables is not allowed to each user, in order to prevent a damaging of the printing system as a result of erroneous settings as well as a confusion of the user. The display of these variables is only reserved for developers and service technicians. In addition to these control variables, registers of individual control units of the printing system can also be read out with the aid of information that is stored in a database, in particular in a management information base of the printing system. Such registers are storage regions of the control units in which are processed data, in particular stored or buffered. The control variables and register data are also generally designated as control data in the following.

Furthermore, the developer and service technician can also implement operator control actions with the aid of the graphical user interface 10, for example with the aid of the graphical function keys of the toolbar 12, and call up user interfaces that are also available to other operating personnel. Both maintenance and service tasks and operator control actions can be thus be executed essentially in parallel with the aid of the graphical user interface 10.

The setting values of the associated control variables can be changed via input of other values in the column "Value" in the section 16 of the graphical user interface 10. The control variables contained in the column "Key" in particular concern settings for generation and arrangement as well as for evaluation of what are known as position markers. The position markers primarily serve to correctly associate (i.e. to position) a print image that is generated on a carrier material by a second printer with a first print image that has already been generated on the carrier material by a first printing unit.

Figure 2:
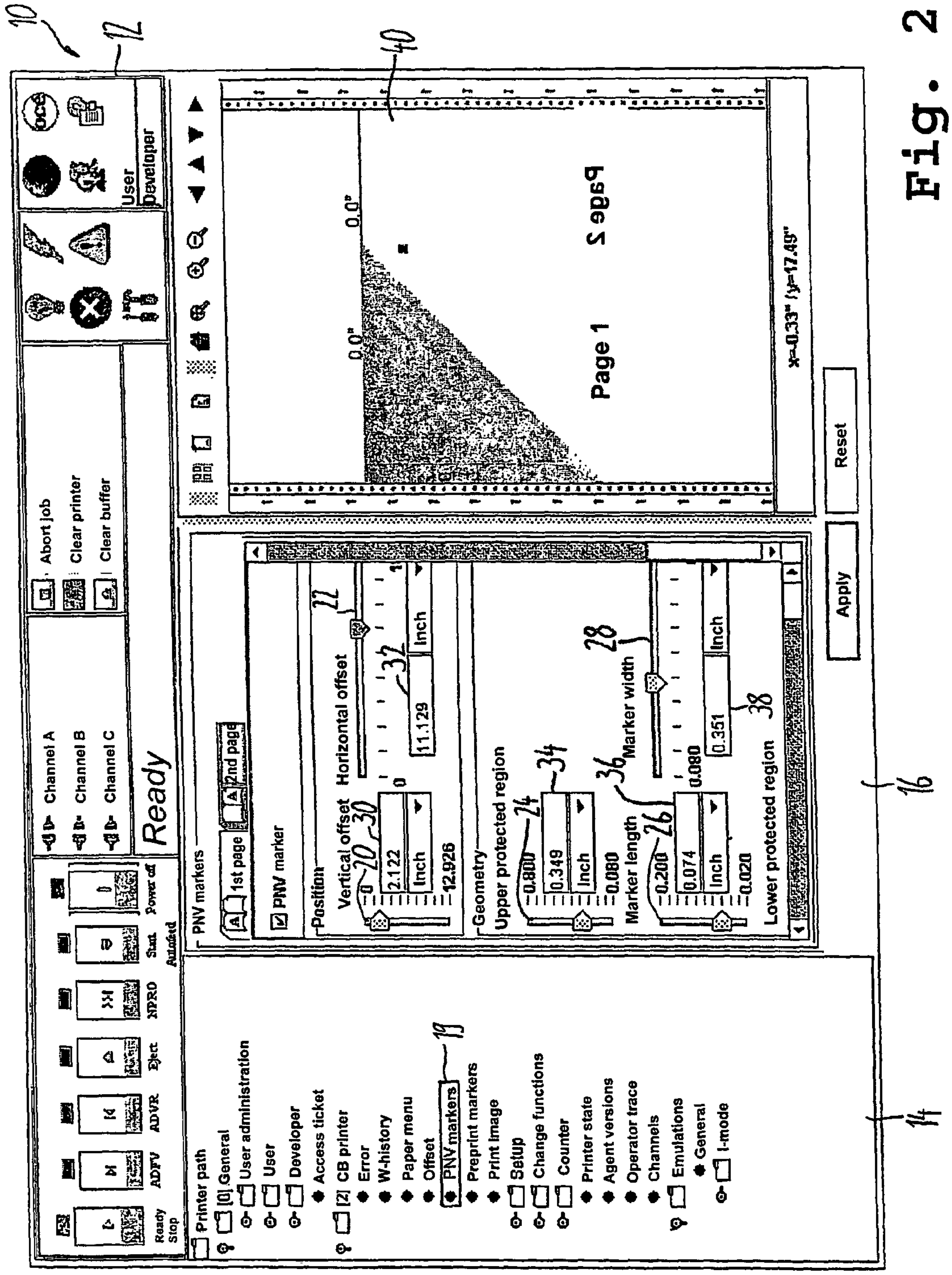
FIG. 2 shows the graphical user interface according to FIG. 1, showing a user interface for input of print parameters.

The graphical user interface 10 according to FIG. 1 is shown in FIG. 2. Identical elements have the same reference characters. The menu entry 19 "PNV markers" has been activated in the menu 14, whereby a user interface for adjustment of the position of the PNV marker (which serves as a position marker) to be set or adapted by an operating personnel in section 16. The user interface contains graphical sliders 20, 22 for adjustment of a vertical and a horizontal offset of the PNV marker, whereby the vertical offset can also be input in the input and output field 30 and the horizontal can also be input in the input and output field 32.

The user interface furthermore contains graphical sliders 24, 26, 28 to establish the geometry of the PNV marker, whereby an upper protection region in which no position marker is generated is set with the aid of the slider 24. The length of the marker to be generated is set with the aid of the slider 26 and the width of the PNV marker to be generated is set with the aid of slider 28. A value that can be set with the aid of the slider 24 can alternatively also be input in the input field 34; a value that can be set with the aid of the slider 26 can alternatively also be input in the input and output field 36; and a value that can be set with the aid of the slider 28 can alternatively also be input in the input and output field 38. Furthermore, the section 16 with the user interface for the PNV marker contains a graphical representation 40 in which the position of the PNV marker is shown on the carrier material according to the settings of the sliders 20 through 28.

The linear dimensions processed by the control units as internal control variables are specified in the measuring unit millipoint. One millipoint corresponds to 0.0547 μm or, respectively, 1/72000 of an inch. The location of the position marker, the dimensions of the position marker, the paper format and further linear dimensions are stored in the printer as values converted into millipoints. These values specified in millipoints thus serve as control data.

Furthermore, a country recognition is preset in a storage region of the operating unit of the printer, whereby the country recognition is, for example, encrypted as a hexadecimal value. Alternatively, the hexadecimal value of the country recognition is stored in a storage region of the further control unit of the printer. A value 17hex stored there is the country recognition for Germany and is simultaneously associated with the measurement unit recognition inch. The value 18hex is the country recognition DE and is simultaneously associated with the measuring unit mm. The value 1Fhex is the country recognition US and is associated with the measuring unit inch. The length values stored in millipoints are converted for display with the aid of the graphical user interface based on the preset country recognition or calculated for display of the linear dimensions with the measuring unit connected with the country recognition. The linear dimensions stored in millipoint are thus converted and output with the present country recognition for display as operating information. If a country specification is output, for example, in inches, the corresponding sum of the linear dimension is converted from millipoints into inches and is output, dependent on the preset language, in a field after number value, for example "Zoll" in DE and "inch" in the US.

A plurality of items of further operating information that are output with the aid of the graphical user interface are formed with the aid of connections of a plurality of control variables and/or a plurality of control and operating states. Thus, for example, at least one item of control information of each control unit of the printer that signals the operational readiness of the respective control unit is necessary for a print readiness signal. The signals of the control units are preferably linked with one another with a UND link, whereby the link result for readiness display is output for the printer and as operating information with the aid of the graphical user interface. The individual control data are transferred on a communication level, for example with the aid of SNMP commands. The control data transferred with the aid of SNMP commands are preferably output with the aid of user interfaces provided for this of the operating unit of the printer or copier. Preferably only service and maintenance technicians have access to the user interfaces via which the control data can be input and output in order to prevent a confusion of the typical operating personnel and faulty operations. Control data are also designated as machine parameters.

Figure 3:
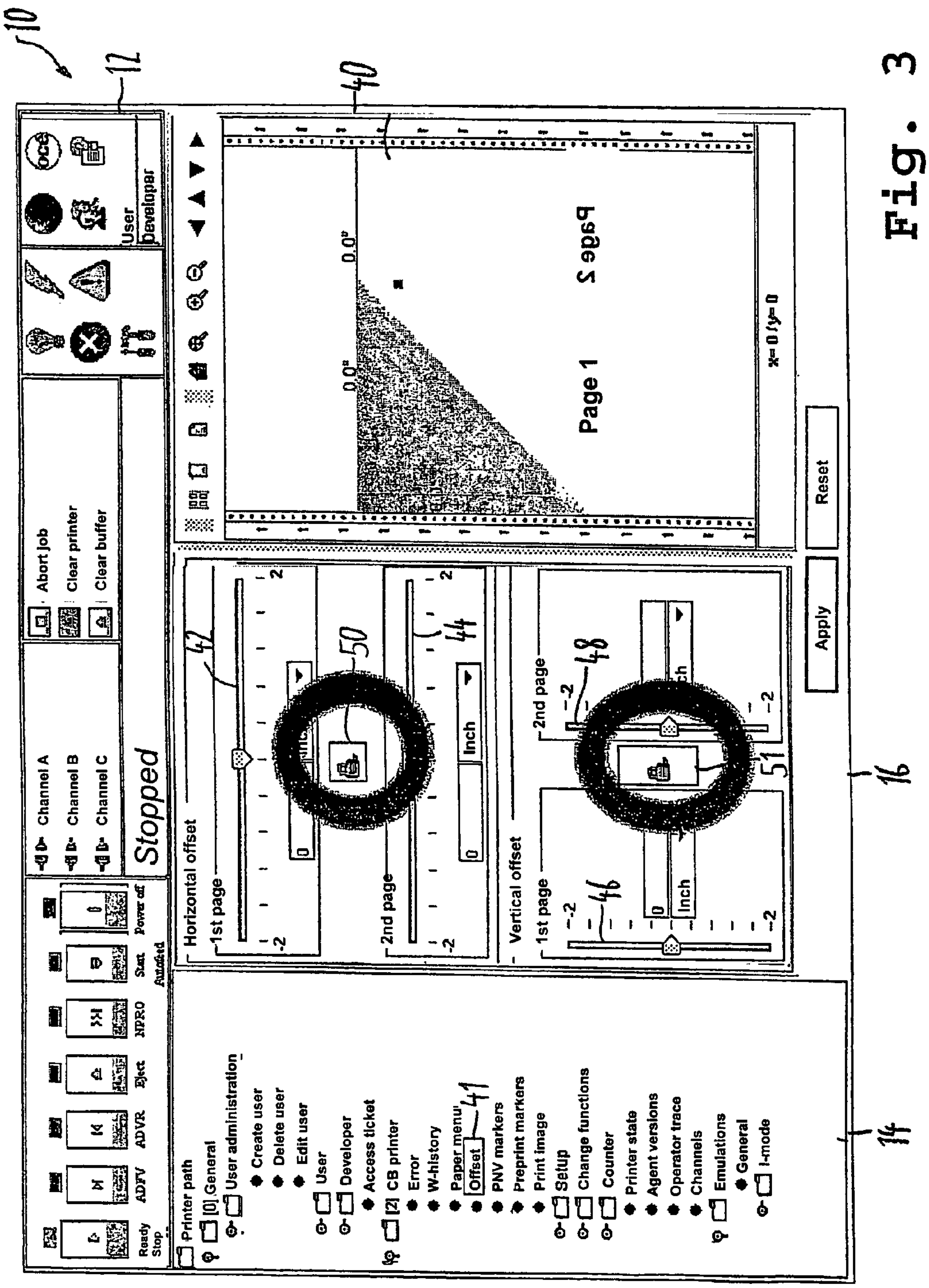
FIG. 3 shows the graphical user interface according to FIGS. 1 and 2 with a user interface to set an offset of the print images, whereby the settings of the offset of a first printer are coupled with the settings of the offset of a second printer.

The graphical user interface 10 according to FIGS. 1 and 2 is shown in FIG. 3. In the menu 14, the menu entry 41 "Offset" has been selected, whereby in the section 16 of the graphical user interface 10 a user interface is shown for adjustment of the offset of the print images that are generated on the back side of the carrier material. The print image of the side 1 (front side) is thereby generated with the aid of a first printer and the print image of the side 2 (back side) is thereby generated with a second printer. The carrier material is a continuous carrier material that is supplied to the second printer after it is output from the first printer.

The positioning of the print images thereby occurs dependent on the position marker generated with the aid of the first printer. A horizontal offset of the print image is established on the side 1 under reference to the position marker with the aid of the graphical slider 11. The horizontal position of the print image on the side 2 is established in reference to the position marker with the aid of the graphical slider 44. The vertical offset of the print image of the side 1 is established in reference to the position marker with the aid of the graphical slider 36 and the vertical offset of the print image of the side 2 is established in reference to the position marker with the aid of the slider 48.

If, for example, a horizontal offset should be generated, the print images of the side 1 and the side 2 must be shifted, in that the setting controllers 42 and 44 are respectively shifted. It is relatively complicated to shift the slider 42 in the same manner as the slider 44. With the aid of a graphical function key 50, the slider 42 can be coupled with the slider 44 such that, upon activation of this graphical function key 50, given a change of the value set at the slider 42 the setting value of the slider 44 is changed by the same amount. It is thereby achieved that the value of the slider 44 is changed dependent on the value of the slider 42. When the graphical function key 50 is activated, given a change of the setting value of the slider 44 the setting value of the slider 42 is automatically changed by the same amount. Given a deactivated function key 50, the setting values of the sliders 42 and 44 can furthermore be set independent of one another.

The sliders 46 and 48 can be coupled in the same manner as the sliders 42 and 44 with the aid of the function key 51. The necessary operator control actions by an operating personnel to set up both printers for preparation of print jobs are thereby significantly reduced and errors are prevented.

Figure 4:
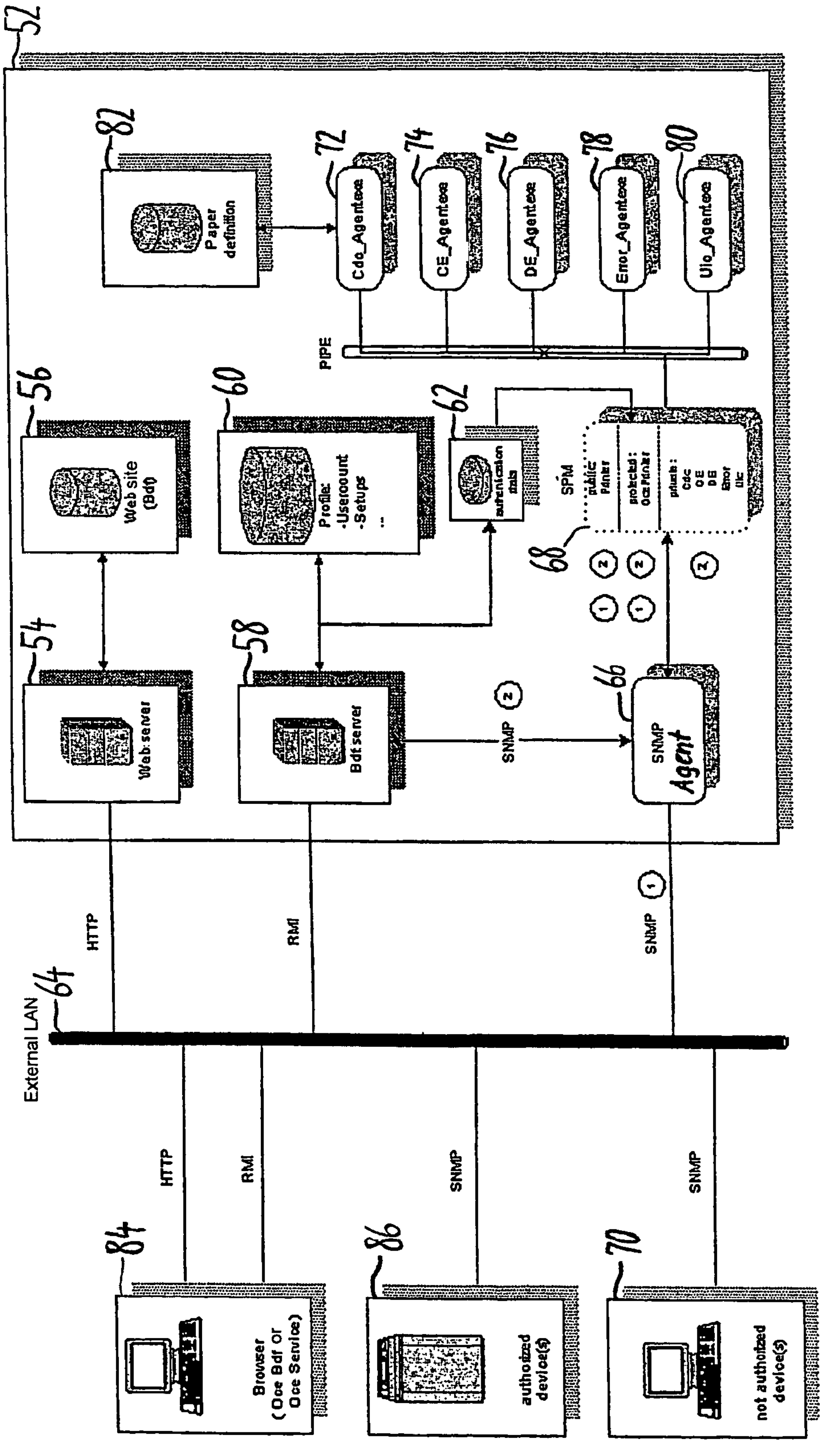
FIG. 4 is a block diagram that shows the access and the authentication of operating units connected with the printer according to a second exemplary embodiment of the invention.

A block diagram for access of operating units 70, 84, 86 to data of the printing system with the aid of network protocols and a remote method invocation communication is shown in FIG. 4. Shown in FIG. 4 are only components (i.e. structural groups and functional units) of the printer 52 that are necessary for activation of operating unit 70, 84, 86 and for an external access of the operating units 70, 84, 86 to the internal data of the printer 52. The operating units 70, 84, 86 are also designated in the following as control panels 70, 84, 86.

The printer 52 contains what is known as a web server 54 that has access to a storage region 56 in which are stored data for display of what is known as a web page, whereby this web page serves as a graphical user interface for the printer 52 and is output on a display unit of an operating unit 70, 84, 86 with the aid of a display program. The display program is executed by a data processing system of the operating unit, whereby the data for display of the web page have been generated with the aid of a Hypertext Markup Language and/or in the programming language Java.

The printer 52 furthermore contains a control panel server 58 with whose help what is known as an RMI communication occurs with an operating unit 70, 84, 86. The control panel server 58 has access to storage regions 60 and 62, whereby printer data and settings for generated of a graphical user interface, what are known as user data, are stored in the storage region 60. Furthermore, data for output of operating information and printer parameters are contained in the storage region 60 and data for authentication of the respective user and/or the operating unit are contained in the storage region 62. The control panel server 58 is connected with an internal network, for example with a local area network (LAN) that is operated with the aid of a Simple Network Management Protocol. With the help of such a Simple Network Management Protocol, it is also possible to simply access the internal printer network via an external network 64 that is connected with the printer 52. A simple access to internal structural groups and program modules of the printer 52 that can be reached with the aid of the internal network (LAN) is thereby possible. What is known as an SNMP agent 66 is provided to control the accesses to the internal components of the printer 52. The SNMP agent 66 is connected with a system parameter manager (SPM) via the internal network.

The system parameter manager 69 administers all printer parameters and control variables of a printing system. For example, the printer system contains two printers that print the same carrier material; thus a system parameter manager (68) that administers at least the interdependent parameters of both printers is provided for these two printers. The system parameter manager 68 preferably administers all parameters and setting values of the two printers. Dependent setting values and parameters of the printing system are coupled by the system parameter manager 68 such that a simple operation of the printing system is possible. The system parameter manager 68 then implements an alignment of the printing setting of the first printer and the second printer.

If, for example, the first printer generates on the carrier material a print image with what is known as a micro-toner that (due to its electromagnetic properties) is machine-readable, the fixing temperature of the second printer for fixing of the print image that is generated on the same carrier material with the help of the second printer must be adapted in order to prevent a damaging of the micro-toner of the first print image. The system parameter manager 68 of the first printer then establishes the values of the control variables of the second printer and transfers these to the second printer. The first printer and the second printer preferably contain what is known as a management information base in which are stored all control variables of the respective printer or of the entire printing system. The system parameter manager 68 of the first printer then writes the new values into this management information base of the second printer. Furthermore, from operating inputs and measurement values the system parameter manager 68 determines setting values for the first printer and writes these into the management information base of the first printer.

The management information base is contained in the system parameter manager 68 in the printer 52 according to FIG. 4. The SNMP agent 66 controls the accesses to the system parameter manager 68. If an unauthorized control panel 70 is connected with the printer 52 via the network 64, the control panel 70 receives only access to approved data (what are known as public data) and to further protected data via the SNMP agent 66, whereby the control panel 70 can access these protected data only for reading and not for writing. The SNMP agent 66 allows the control panel 70 neither read nor write accesses to internal control variables of function groups 72 through 80 of the printer 52 and to data that are stored in the storage region 82. The internal control variables of the function groups 72 through 80 and the data in the storage region 82 are also designated as private data.

The data transfer between the function groups 72 through 80 and the system parameter manager 78 occurs based on the Simple Network Management Protocol (SNMP) with the aid of what is known as a pipe. The pipe is a connection-oriented communication channel between two processes that is also designated as a stream. Pipes generally connect among one another independent processes that are not directly related to one another. In particular the function groups 72 through 80, the SNMP agent 66 and the system parameter manager 68 are program modules that are executed with the aid of a data processing system of the printer 52, for example with the aid of a personal computer.

A second control panel 84 is likewise connected with the printer 52 over the network 64. The control panel 84 contains a data processing system that, in addition to an operating system, runs a display program (what is known as a browser program module). In particular graphical user interfaces can be generated with the aid of a hypertext or with the aid of program code with such a browser program module. The control panel 84 receives these hypertexts over the network from the web server 54, which transfers at least one part of the hypertexts that are stored in the storage region 56 to the control panel 84. The graphical user interface so generated in particular contains input and output fields and graphical function keys whose display values or, respectively, whose switch states are displayed on the control panel 84 with the aid of data that are transferred by the control panel with the aid of an RMI communication. RMI (Remote Method Invocation) is the designation for a communication technique between objects defined in the programming language "Java", whereby what is known as a Remote Procedure Call or what is known as the Common Object Request Broker Architecture is used as a transport mechanism for RMI.

The graphical elements of the graphical user interface that are then displayed with the aid of the control panel 84 are thus loaded by the web server 54, whereby the data displayed and input via the graphical user interface are transferred from and to the control panel server 58 with the aid of RMI. The control panel server 58 is also designated as an RMI server. The control panel 84 is a client both for the control panel server 58 and for the web server 54. The accesses to the internal control variables by the control panel 84 occur via the control panel server 58. The control panel server 58 is connected with the SNMP agent 66. As already explained further above, the control panel server 58 implements an authentication with the aid of authentication data 62. After this authentication, via which it is checked whether the control panel 84 or the control panel server 58 has rights for access to the internal control variables and parameters, the control panel server 58 obtains unlimited access to the system parameter manager 68 through the SNMP agent 66. The control panel server 58 thus has access to the public data, to the protected data and to the private data.

The control panel 84 is directly arranged in the housing of the printer 52. Further similar control panels can also be arranged remote from the printer 52 and also be provided for simultaneous operation of a plurality of printers similar to the printer 52. It is also possible to arrange a further control panel (similar to the control panel 84) in a service control center of the printer manufacturer. If the network 64 is, for example, connected with a further network, in particular the World Wide Web of the Internet, the further control panel can also be spatially arranged very far removed from the printer 52. The further control panel must only be connected with this World Wide Web directly or via a further network. It is thereby possible in a very simple manner for service technicians to determine error states and error causes with the aid of the available system parameters without a service technician having to be on site at the printer 52. Transit times of the service technician can thus be saved and downtimes of the printer 52 can be shortened. Furthermore, a control panel 86 is provided that is contained in a printer application. This control panel 86 is, like the control panel 70, connected with the SNMP agent 66 via the network 64, whereby the data transfer between the print server 86 and the SNMP agent 66 occurs with the aid of a Simple Network Management Protocol (SNMP).

Via the arrangement of an activation, i.e. a connection, of a control panel 84 shown in FIG. 4, it is possible in a very simple manner, with the aid of a personal computer or another data processing system, to provide a control panel 84 for a printing system without a special configuration or installation being necessary. The personal computer must only contain an arbitrary operating system and a browser program module for display of hypertexts, whereby the browser program module must support what is known as the Java applet and thereby the communication with the aid of RMI. However, nearly all available personal computers presently fulfill these requirements. Thus no special software is necessary for operation of the control panel with the aid of the data processing system with whose help the control panel 84 is realized. All data necessary for generation of the graphical user interface are provided by the web server 54 and by the control panel server 58. Furthermore, the control panel 84 only has to be connected with a network 64 via which data can be transmitted to and from web server 54 and to and from control panel server 58. As already mentioned, the control panel 84 can also be connected to a different network than the printer 52 when both different networks are, if applicable, connected with one another over a further network.

In other exemplary embodiments, the control panel server 58 also contains the hypertext and further data for generation of the graphical user interface on the control panel 84. A separate web server 54 than is contained in the printer 52 is then not necessary in these exemplary embodiments.

In a further exemplary embodiment, the management information base is contained in the storage 60. The management information base contains data that are arranged in the same structure as that in which the control units and function units contained in the printer 52 are organized. Arrangement of the control variables and parameters is thus hierarchically structured just like the control and function units of the printer 52. In the exemplary embodiment shown in FIG. 4, such control and function units are represented as function groups 72 through 80, system parameter manager 68, SNMP agent 66, control panel server 58 and web server 54. The storage region 82 in which paper parameters are stored is hierarchically subordinate to the function group 72, whereby the parameters stored in the storage region 82 are subordinate to the function group 72. Thus stored in the storage region 60 in the management information base are the hierarchical structure and names of the variables as clear text designations that are stored in the storage region 82. With the help of the clear text designations of the variables stored in the storage region 82 in the management information base, these can be output on the control panel 84 in a form concise and intelligible (in which the clear text designation and the value of the variables are displayed) to the observer, for example for a service technician.

The print server 86 access the SNMP agent 66 with the aid of a printer-specific interface, whereby the print server 86 can also access what is known as the private data with the aid of an authentication. The data transfer between control panel 70 and SNMP agent 66 occurs with the aid of SNMP, however this control panel 70 does not support the printer-specific SNMP interface via the control panel server 58. The control panel 70 thereby has no access to the private data.

With the aid of the arrangement shown in FIG. 4, it is possible that the control panel server 58 has access to all function groups 72 through 80 and storage regions 60, 62 of the printer 52 and the access rights of unauthorized control panels 70 are limited. The print server 86 is authorized and thus has access to the management information base of the printer 52, to the public data and protected data. As an unauthorized control panel, the control panel 70 only has access to the management information base of the printer 52, whereby the accesses are in the general read and write accesses.

Figure 5:
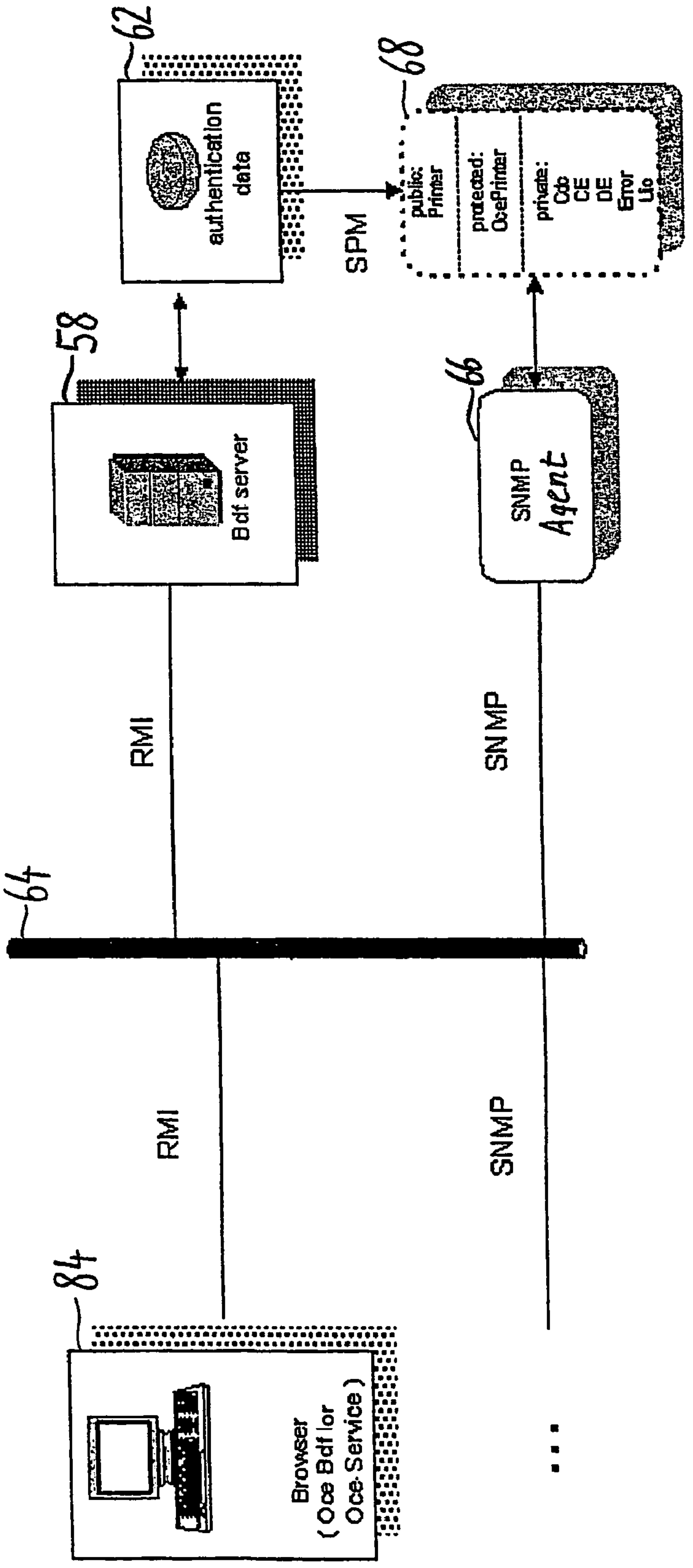
FIG. 5 is an excerpt of the block diagram according to FIG. 4, in which is shown the basic principle of a secured access to the data contained in the printer.

A section of the block diagram according to FIG. 4 is shown in FIG. 5 with the control panel 84, the network 64, the control panel server 58, the data storage 62, the SNMP agent 6 and the system parameter manager 68. Given each read and write access of a control panel 70, 84, 86, the system parameter manager 68 checks whether the query comes from an authenticated unit, for example from an authenticated control panel 84, 86, the control panel server 58 or a function group 72. Respectively at least one network address (for example an IP address) is associated with each function group 72 through 80, the servers 54, 58, the SNMP agent 66 and the control panels 70, 84, 86. With the help of these IP addresses and further specifications, such as what is known as the port of the SNMP agent to which the read or write access is directed, the system parameter manager 68 analyzes via which control panel 84, 86, 70 or via which control panel server 58 the respective read and/or write access occurs, whereby depending on a preset the system parameter manager 68 limits the access rights of the respective control panel 70, 84, 86 and/or of the control panel server 58.

In the present exemplary embodiment, the control panel server 58 and the system parameter manager 68 is respectively realized via a program module that is executed on the same data processing system that contains an operating system, for example MS Windows NT. Due to the execution on the same data processing system, an encryption of the data transferred between the control panel server 58 and the system parameter manager 68 is not necessary. With the help of the IP address of the control panel server 58, the system parameter manager 68 determines that the control panel server 58 is connected with the system parameter manager 68 over a local (internal) network of the printer 52. Given an execution of the program modules of the control panel server 58 and of the system parameter manager 68 on the same data processing system, the control panel server 58 also has a different IP address than the system parameter manager 68, whereby the IP addresses differ such that they are arranged in the same network.

Since the system parameter manager 68 recognizes the affiliation of the control panel server 58 to the same network due to what is known as the local IP address of the control panel server 58, a further authentication of the control panel server 58 is not necessary and the system parameter manager 68 forwards the write and/or read accesses to the respective function group 72 through 80. Furthermore, a limitation of the accesses can occur via a user setting at the control panel 70, 84, 86. Via this user setting, an operating personnel can be refused the read and/or write access to a parameter or to whole user interfaces, even when the respective control panel 70, 84, 86 has general accesses to these parameters or this control panel. For example, the IP addresses of the control panel 84 and of the control panel server 58 that should receive access to the protected data of the printer 52 are stored in the storage region 62. The storage of these network addresses preferably ensues with the help of encrypted data.

Figure 6:
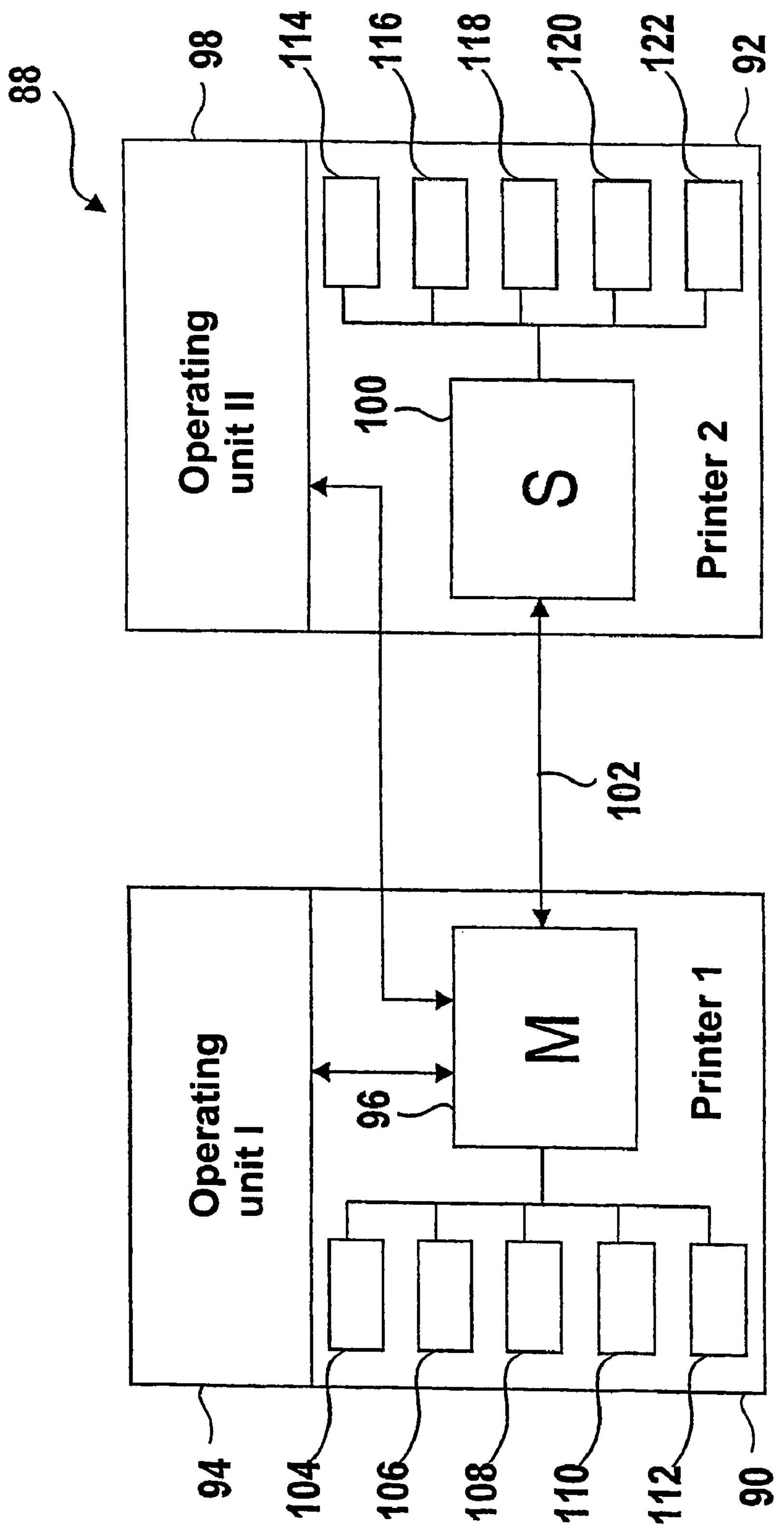
FIG. 6 shows a block diagram with two printers according to a third exemplary embodiment of the invention, which two printers respectively contain an operating unit, whereby both printers can be operated via the operating unit.

A block diagram of a printing system 88 with a first printer 90 and a second printer 92 is shown in FIG. 6. The first printer 90 contains a first operating unit 94 and a first control unit 96. The second printer 92 contains a second operating unit 96 and a second control unit 100. The first control unit 96 and the second control unit 100 are connected with one another over a data line 102, whereby the first control unit 96 serves as a master controller M and the second control unit 100 serves as a slave controller S. Further control units and/or function units 104 through 112 are connected with the control unit 96 via an internal network of the first printer 90. Values of parameters and control variables of the first printer 90 are stored in the storage region of the control unit 96 and the control units or function units 104 through 112.

Control units and/or function units 114 through 122 are connected with the control unit 100 via a local network of the second printer 92. Just as with the first printer 90, the control units 100 as well as the control units or function units 114 through 112 contain control variables and parameters of the printer that are stored in storage regions of the respective control unit 114 through 122. The printers 90 and 92 are essentially identical in construction. The printer 90 is preferably operated together with the printer 92 as what is known as a twin system 88, in which a first printer 90 generates a first print image on a carrier material, preferably a continuous carrier material, and the second printer 92 generates a second print image on the same carrier material. With such a twin system 88, the carrier material is then printed on the front side with the aid of the first printer 90 and printed on the back side with the aid of the second printer 92. However, a carrier material can also be printed two-color with the aid of such a twin system 88, whereby the first printer 90 generates a print image in a first ink color and the second printer 92 generates a print image in a second ink color, whereby the second print image is essentially printed over the first print image.

The control unit 96 (serving as a master controller) of the first printer 90 generates data for control of the first operating unit 94 and the second operating unit 98 or for generation of a graphical user interface. The control unit 96 thus transfers at least display data to the operating unit 94 and to the operating unit 98 and evaluates operating inputs of the operating unit 94 and of the operating unit 98. Given an input with the aid of an operating unit 94, 98, it is then determined which printer 90, 92 this operating input concerns. The control unit 96 evaluates the operating unit and, dependent on the operating input, transfers data to the control units 100, 104 through 112, whereby (if applicable) the control unit 100 forwards the data to the control units 114 through 112. If an operating input concerns only the printer 90, the corresponding parameter or the corresponding control variable is changed in the printer 90. Data are thereby not transferred over the data line 102 to the control unit 100. However, if the operating input concerns both printers 90, 92 or only the printer 92, corresponding data are transferred from the control unit 96 of the printer 90 to the control unit 100 of the printer 92 over the data line 102.

A simple operation of a printing system 88 with two printers 90, 92 is possible with the aid of the arrangement shown in FIG. 6 for control of two operating units 90, 98. Both settings for the first and/or second printer 90, 92 can thereby be implemented from each of the operating units 94 and 96. Further operating units via which both the printer 90 and the printer 92 can be very simply operated can be connected to the control unit 96. As already described in connection with the exemplary embodiments previously explained, diverse maintenance jobs and diagnosis functions can also be implemented with the aid of the operating units 94 and 98 as well as with the aid of further operating units that can be connected to the control unit 96.

Figure 7:
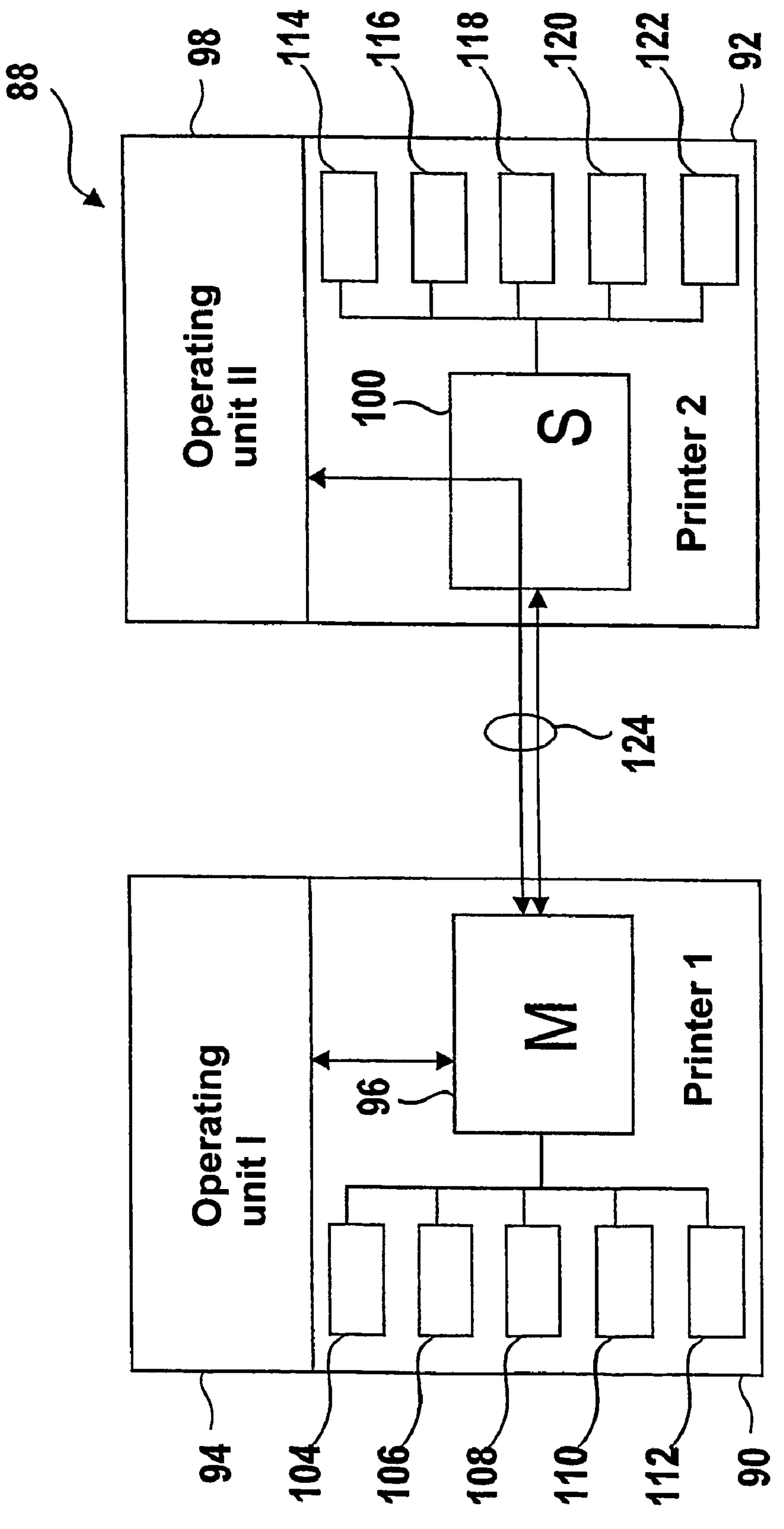
FIG. 7 is a block diagram with two printers, similar to the block diagram according to FIG. 6, according to an alternative embodiment.

A block diagram of the printer system 88 is shown in FIG. 7 that is similar to the block diagram according to FIG. 6. In contrast to the block diagram according to FIG. 6, the data are transferred both between the control unit 96 and the control unit 100 and the display data are transferred between the printer 90 and the printer 92 via a data line 124. The data line 124 is thereby preferably a local area network (LAN). The data transferred to the control unit 100 to generate a graphical user interface for the operating unit 98 are transferred by the control unit 100 to the operating unit 98. Data with information that have been input with the aid of the operating unit 98 are transferred by the operating unit 98 to the control unit 96 via the control unit 100. In contrast to the embodiment according to FIG. 6, the printers 90 and 92 according to FIG. 7 are thus connected in hardware via only the data line 124. In other embodiments, the operating unit 98 and the control unit 100 are respectively connected with the data line 124.

Figure 8:
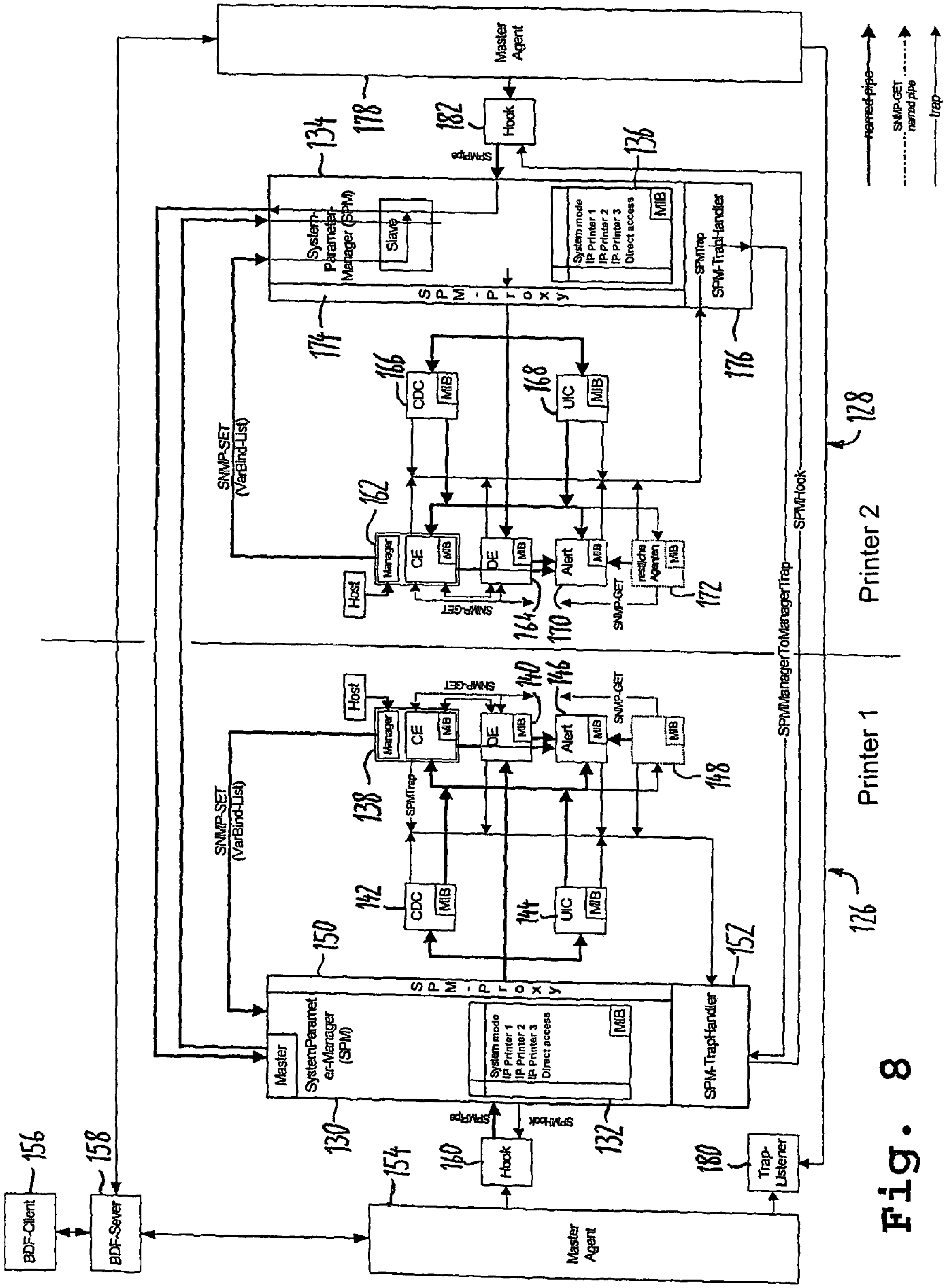
FIG. 8 is a block diagram with control units of two similar printers and a common server for activation of a common operating unit.

A block diagram with control elements of a printing system with two printers 126, 128 is shown in FIG. 8. The printers 126 and 128 are designed essentially identical. The printer 126 has a control unit 130 that serves as a system parameter manager master (SPM master) in the printing system. The SPM master 130 implements an alignment of the printer settings of the printing system, i.e. of the printer settings of the printer 126 and printer 128. The SPM master 130 contains a management information base 132 in which are stored printer settings as control and system variables as well as parameter values. The printer 128 comprises a control unit 124 similar to the SPM master 130 of the printer 126. The control unit 134 likewise contains a management information base 136. The control unit 134 serves as a system parameter manager slave (SPM slave), whereby the SPM master 130 also sets or writes values into the management information base 136 of the printer 128 based on user inputs via a control panel 156. The printer 126 contains further control units 138 through 148 that are connected among one another and with the SPM master 130 over data lines, whereby the communication between the SPM master 130 and the control units 138 through 148 occurs with the aid of a proxy program module 150 and a trap handler 154. The control units 130, 138 through 148 are realized as program modules, preferably as software agents. The transfer of data, in particular of system variables, between the control units 130, 142 through 148 and the management information base 132 preferably occurs with what are known as get, set and trap commands corresponding to the SNMP. The get commands in particular serve for retrieval of data from the management information base 132, the set commands serve for alteration of data in the management information base 132 and the trap commands serve for direct transfer of information via an agent 130, 138 through 148. The printer 126 furthermore contains a master agent 154 that collects and stores data of the printer 126 for display on a control panel 156 of the printing system. The master agent 154 transfers these data upon request to a control panel server 158 of the printing system. The control panel server 158 is preferably fashioned as an RMI server. The control panel 156 is connected with the control panel server 158 as a client. The master agent 154 is connected with the control unit 130 via a data interface 160.

The printer 128 has control units 162 through 172 that essentially coincide in function and design with the control units 138 through 148 of the printer 126. The communication between the SPM slave 134 and the control units 162 through 172 likewise occurs as described in connection with the printer 126, via a proxy program module 174 and via a trap handler 176. The printer 128 contains a master agent 178 that is connected with the control panel server 158. The master agent 154 and the master agent 178 are furthermore connected with the aid of a data line, whereby what is known as a trap listener 180 controls the data transfer between the master agent 154 and the master agent 178. The control unit 134 and the master agent 178 are connected with one another over a data interface 182. Furthermore, data are transferred between the data interface 160 and the data interface 182 between the printer 126 and the printer 128. The SPM control units 130 and 134 are connected via a first SNMP pipe for transfer of data from the SPM slave 134 to the SPM master 130 and via a second SNMP pipe for transfer of data from the SPM master 130 to the SPM slave 134.

Via the arrangement and structuring of control units of a first printer 126 and of a second printer 128 shown in FIG. 8, it is possible in a simple manner to operate both of these printers 126, 128 via a common control panel server 158. A common graphical user interface for operation of the printer 126 and of the printer 128 can thereby be simply provided. Further control panels can also be connected to the control panel server 158. The SPM control units 130 and 134 respectively serve as a central interface of the respective printer 126, 128 for the system variables and system parameters of the respective subordinate control units 138 through 148 as well as 162 through 172. The exchange of control variables between controllers 138 through 148 subordinate to the SPM master 130 also occurs essentially only with the involvement of the SPM master 130. A transfer of control variables between the control units 162 through 172 in the printer 128 likewise occurs using the SPM slave 124 as a communication node.

Direct accesses of the master agents 154 and 178 to control units 138 through 148 or 162 through 172 are not possible in order to achieve a coupling of at least one part of the setting values of the printer 126 and of the printer 128 via the SPM master 130. A very simple and efficient operation of the entire printing system, i.e. of the printers 126 and 128, can occur via this coupling.

The setting values that concern the parameters of the carrier material to be printed are at least identical for a print job for both printers 126, 128. Via such a coupling, these setting values no longer have to be separately changed for each printer 126, 128 when parameters for another carrier material are used. Rather, only one user interface for both printers 126, 128 is output on the control panel for setting the parameters of the carrier material, whereby the input setting values are then used for the printer 126 and the printer 128. Given other setting values such as, for example, given the fixing temperature, dependent parameters or influencing parameters dependent on the settings of the printer 126 are then changed in the printer 128 corresponding to a preset. If, for example, the fixing temperature is increased in the printer 126, the print image to be generated by the printer 128 is shrunk. A greater shrinking of the carrier material occurs upon fixing in the printer 126 due to the higher fixing temperature, whereby the print image generated by the printer 126 also shrinks together with the carrier material. The print image subsequently generated by the printer 128 must then be reduced in size by the amount of the shrinkage of the carrier material so that the print images of the printer 128 and of the printer 126 are congruent to one another, i.e. in register.

The control units 144 and 168 are also designated as user interface controllers. A compensation of printer-specific settings of the local printer 126, 128 is implemented with the aid of the control units 144, 168. The control units 142 and 166 are also designated as common data controllers. The control units 142, 166 implement a compensation of non-printer-specific settings of the respective printer 126, 128 such as, for example, the settings of the paper width in the control units 138, 140 or 162, 164. The control units 140, 164 are designed as a device controller and the control units 138, 162 are designed as a controller of the respective printer 126, 128.

Figure 9:
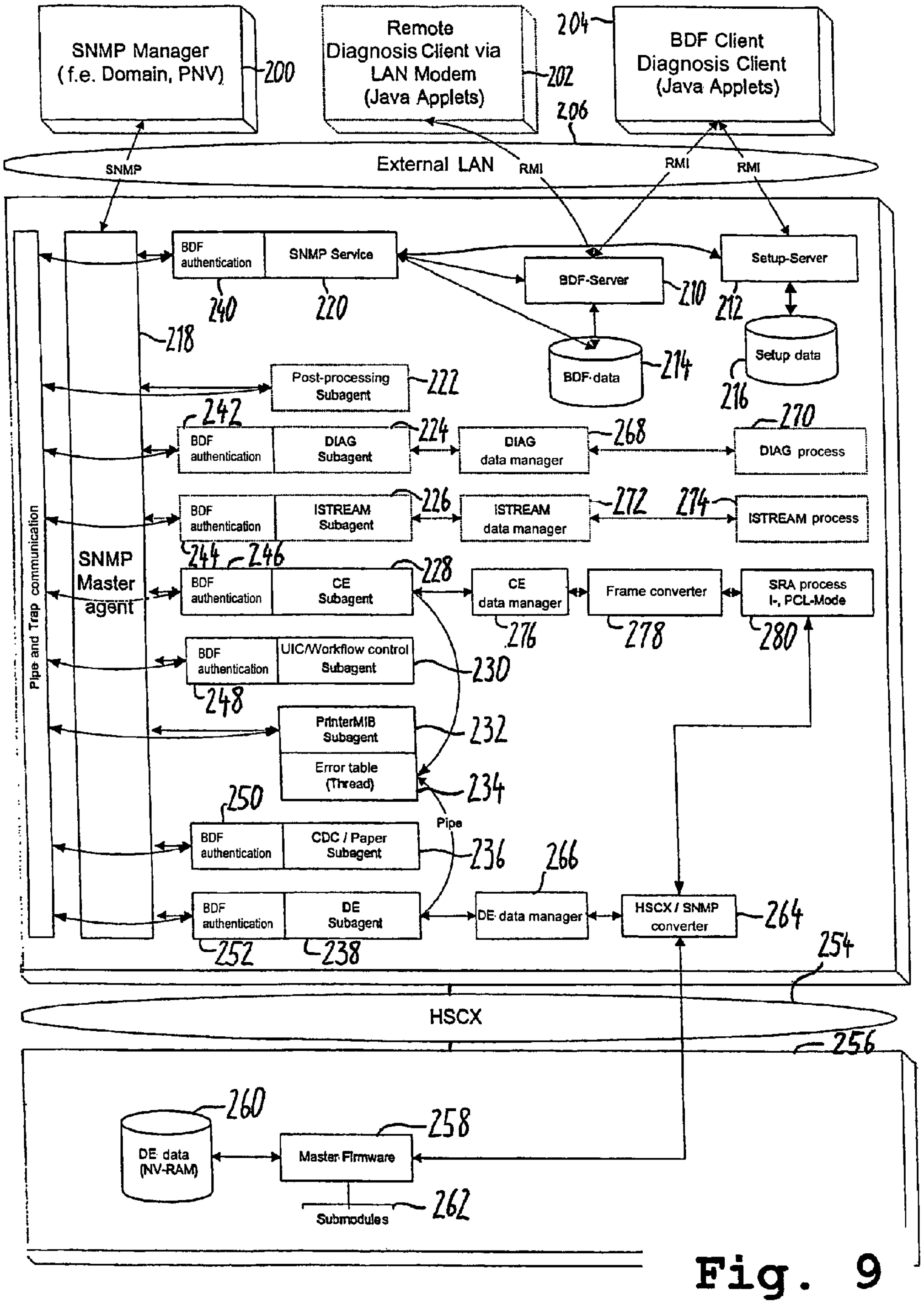
FIG. 9 is a block diagram with control units and display units of a printing system for communication with operating units.

A block diagram is shown in FIG. 9 in which is depicted the communication with the aid of the Simple Network Management Protocol (SNMP) given a printer controller 208 for activation of control panels 200, 202, 204. Control panels 200, 202, 204 are connected with the printer controller 208 via an external LAN (local area network) 206. The control panels 202 and 204 communicate with a control panel server 210 and a setup server 212 with the aid of an RMI communication based on SNMP. The control panel server 210 has a storage region 214 for storage of control panel data and the setup server has a storage region 216 for storage of setup data. The control panel 200 is connected with an SNMP master agent 218 via the external LAN 206. The control panel 200 has access to an SNMP service program 220 via this SNMP master agent 218. With the aid of the SNMP service program 220, data can be transferred from the control panel 210, from the setup server 212 and from the storage region 214 with control panel data to the control panel 200 as well as from the control panel 200 to the control panel 210, the setup server 212 and the storage region 214. Furthermore, the control panel 200 is connected via the external LAN 206 and via the master agent 218 with a post-processing sub-agent 222, a diagnosis sub-agent 224, a data stream sub-agent 226, a controller sub-agent (that serves for communication with a host computer), a workflow control sub-agent 230, a printer management information base sub-agent 232, with an error table 134, with a common data control sub-agent 236 for paper control and with a printer control sub-agent 238.

The access via the SNMP master agent 218 to the SNMP service program 220 as well as the access to the sub-agents 224, 226, 228, 230, 236, 238 occurs only after an effected authentication of the control panel 200, 202, 204 and/or of the user logged on via this control panel with authentication procedures 240 through 252 associated with this sub-agent or, respectively, programs. Further control units of the printer subordinate to the printer controller 208 are connected with the printer controller 208 via what is known as an HSCX-BUS 254. One of these control units is provided with the reference character 256 in FIG. 9. The control unit 256 has a firmware 258, a storage region 260 and further sub-modules, of which one is designated with 262.

The data transferred with the aid of the HSCX-BUS system 254 are converted into an SNMP-compliant data format with the aid of a converter 264. Data that are transferred from the printer controller 208 to the control unit 256 are converted from the SNMP format into the HSCX format. An element 266 arranged between the converter 264 and the printer controller sub-agent 238 serves for administration of the data of the printer controller, in particular of the data that are transferred to the subordinate controllers 256 and the data that are transferred by the subordinate controllers 256 to the printer controller 208.

A data manager 268 is likewise associated with the diagnosis sub-agent 224, which data manager 268 administers the data that are supplied to a diagnosis process 270 and the data that are transferred from the diagnosis process 270 to the diagnosis sub-agent after an effected diagnosis. A data manager 272 that administers the data that are transferred from and to a data stream process 274 is associated with the data stream agent 226. The controller sub-agent 228 is connected with a data manager 276 that transfers the data to what is known as a claim converter 278 and further to a raster processor 280 that prepares data for a respective preset printer mode. The prepared data are then transferred from the raster processor 280 to the converter 264 and thus further via the HSCX-BUS 254 to the controller 256. The printing process to generate print images on a carrier material is then controlled with these data transferred to the controller 256. The controller sub-agent 228 in particular processes the print data stream that contains print data for generation of print images.

Although preferred exemplary embodiments are shown and described in detail in the drawings and in the preceding specification, this should be viewed as purely exemplary and not as limiting the invention. It is noted that only the preferred exemplary embodiments are shown and described, and all variations and modifications that presently and in the future lie within the scope of protection of the invention should be protected.

We claim as our invention:

1. A control system for a printing or copying system, comprising:

a first printer and a second printer;

at least one operating unit for input and output of operating information of the printing or copying system and which is connected via an external network connection with said first printer in which is provided a first control unit that controls the first printer, and comprises a control panel server internal to said first printer which the at least one operating unit accesses as a client to output control data from the first printer containing internal control variables of said first printer not otherwise accessible by the operating unit;

graphical elements of a graphical user interface stored in a memory of the first printer, said graphical elements being transferred into the at least one operating unit and loaded there for display;

the first printer comprising an internal network;

the control panel server being connected via said internal network with a network agent via which a data exchange takes place with a plurality of sub-controllers of said first printer;

at least one second control unit in the second printer which controls a plurality of sub-controllers of said second printer;

a data line via which the first and second control units are connected with one another and via which the control data is transferred from said first control unit to said second control unit with aid of a data transfer protocol;

the at least one operating unit outputting the control data in addition to the operating information, the control data also being used to set system parameters of the second printer;

the first and the second control units containing a distributed object model with objects aiding access to the operating information and to the control data; and values of the internal control variables being output from the first printer with aid of the at least one operating unit, the values being administered with aid of a management information base.

2. The control system of claim 1 wherein the second control unit is provided in a second apparatus to control it;

the control panel server is connected with a master system parameter manager provided in the first apparatus;

the control panel server implements a synchronization of settings between image acquisition apparatus of the first apparatus and a corresponding slave system parameter manager of the second apparatus; and given an input of a first value of a first parameter in the first printer, by said control data a second value of a same parameter of the second apparatus is automatically modified depending on a value of the first parameter.

3. The control system according to claim 2 wherein the first value and the second value are coupled with one another such that, given a change of one of the first and the second values in a coupled state, the respective other value is modified by a same amount.

4. The control system according to claim 1 wherein a web server is provided that has access to the memory, and stored data for graphical elements are designed for display of a web site.

5. The control system according to claim 4 wherein data for the graphical elements of a user interface are generated with aid of a Java programming language or Hypertext Markup Language and are transferred from the control panel server to the at least one operating unit by means of Remote Method Invocation.

6. The control system according to claim 1 wherein the at least one operating unit has at least one object for input or output of the operating information and the control data, wherein data transfer between the at least one operating unit and the first control unit occurs with aid of the at least one object.

7. The control system according to claim 6 wherein a standardized model for abstract description of distributed objects occurs according to a Common Object Request Broker Architecture.

8. The control system according to claim 1 wherein:

information of the control data are stored in a central database of the printing or copying system, wherein the information comprises at least a hierarchical classification of existing structure of control units and function units; and in which the first control unit of the printing or copying system has access to the control data with aid of said information.

9. The control system according to claim 1 wherein a distributed object model using a network protocol is provided for transfer of the control data and the operating information between the first and the second control units, and at least one further control unit or a database.

10. The control system according to claim 3 wherein an automatic modification of the first value or the second value of a same parameter is activated and deactivated.

11. A method for input and output of operating information and control data of a printing or copying system, comprising the steps of:

providing a first printer and a second printer, and providing the first printer with an internal network;

providing at least one operating unit for input and output of operating information of the printing or copying system and which is connected via an external network connection with said first printer in which is provided a first control unit that controls the first printer, and comprises a control panel server which the at least one operating unit accesses as a client to output control data from the first printer containing internal control variables of said first printer not otherwise accessible by the operating unit, the control panel server connected via said internal network with a network agent via which a data exchange takes place with a plurality of sub-controllers of said first printer;

storing graphical elements of a graphical user interface in a memory of the first printer, said graphical elements being transferred into the at least one operating unit and loaded there for display;

providing at least one second control unit in the second printer which controls a plurality of sub-controllers of said second printer, a data line also being provided via which the first and the second control units are connected with one another and via which the control data is transferred from said first to said second control units with aid of a data transfer protocol;

outputting the control data by the at least one operating unit in addition to the operating information, and using the control data to set system parameters of the second printer; and accessing of the operating information and the control data taking place with aid of a distributed object model objects of which are contained in the first and the second control units, values of the internal control variables contained in the control data being output from the first printer with aid of the at least one operating unit, and administering the values with aid of a management information base.

* * * * *